Oct. 25, 1955  C. E. ROEMER  2,721,996
TRIGGERING CIRCUIT
Filed July 23, 1952  2 Sheets-Sheet 2
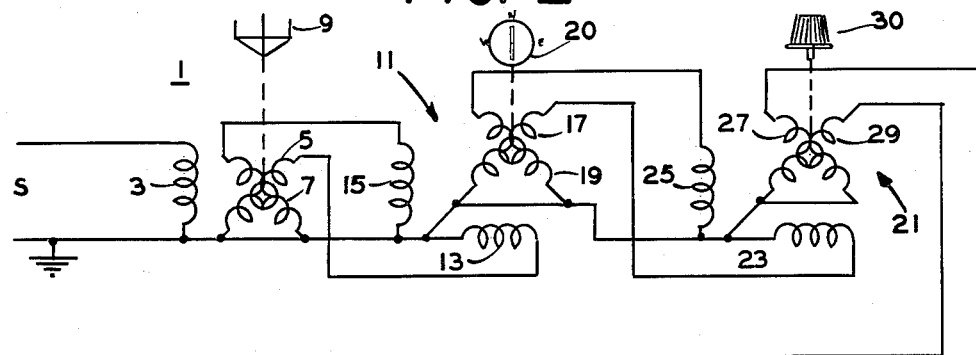
FIG. 2
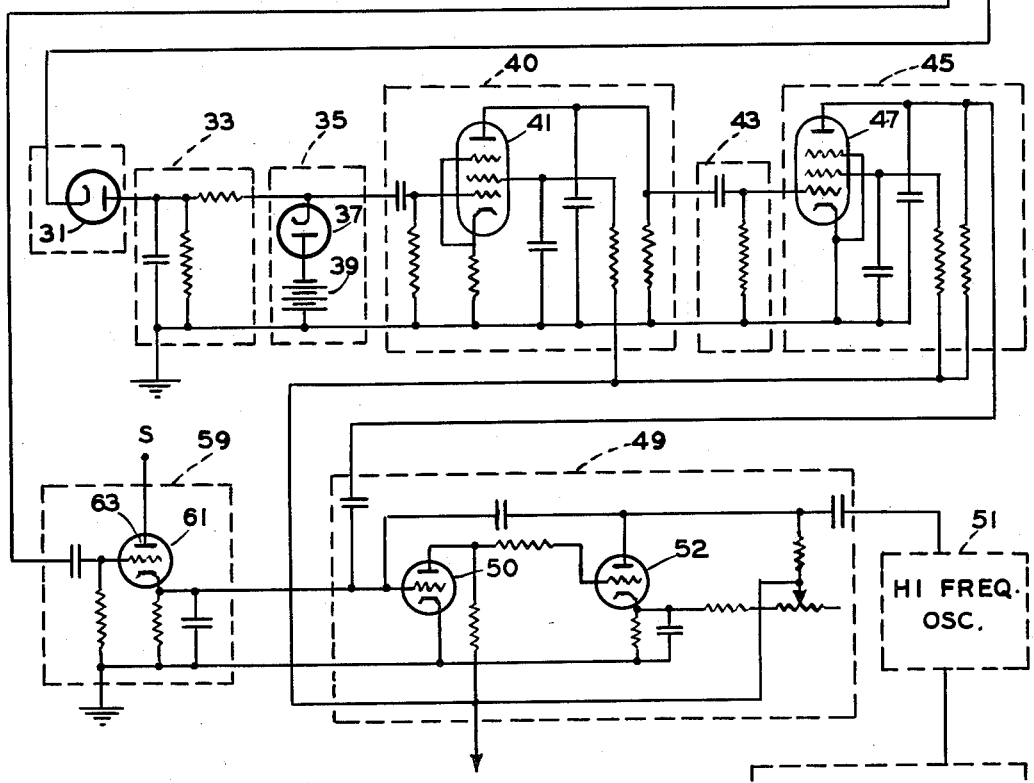
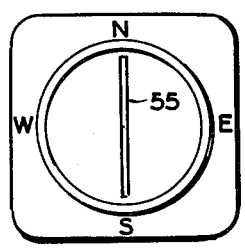
FIG. 3
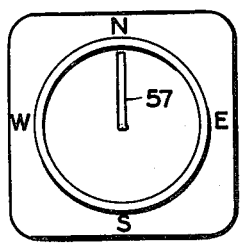
FIG. 4
INVENTOR.
CARL E. ROEMER
BY
*Schwartz*
ATTORNEY

United States Patent Office 2,721,996
Patented Oct. 25, 1955

2,721,996

TRIGGERING CIRCUIT

Carl E. Roemer, Lyndhurst, N. J., assignor to Bendix Aviation Corporation, Teterboro, N. J., a corporation of Delaware Application July 23, 1952, Serial No. 300,370

9 Claims. (Cl. 343—118)

The invention relates to triggering circuits and, more particularly, to triggering circuits responsive to modulated alternating current signals.

In triggering circuits used heretofore, two pulsations are provided for each modulated signal cycle and the time at which the pulsations occur during each cycle of a reference voltage is determined by the phase of the signal relative to the reference voltage. If a triggering circuit of this kind is used with an oscilloscope, the two pulsations occurring each cycle appear on the oscilloscope screen as a diametral line. While this may be satisfactory in many instances, the diametral line causes confusion when used as a direction reference because it can not be readily determined whether the reference indicates one direction or a direction 180° therefrom.

One object of the present invention is to provide a triggering circuit which provides only a single pulse for each modulated signal cycle.

A more detailed object of the invention is to provide a directional reference on a radar scope in the form of a radial line to avoid confusion in reading the indication.

The invention contemplates a triggering circuit comprising a signal generator for providing a pair of modulated alternating current signals 90 degrees out of phase with one another, means connected to the signal generator for receiving one of the signals and producing a sharp pulse with each reversal of the signal, and means connected to the signal generator and controlled by the other signal for rendering ineffective alternate voltage pulses from the first means so that the output of the circuit comprises a series of sharp pulses corresponding to the frequency of the modulated signal. The pulses may control energization of a multivibrator connected to both means whereby the multivibrator produces a single trigger pulse for each modulated signal cycle.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

In the drawings, Figure 1 is a block diagram showing a triggering circuit constructed according to the invention and controlling a high frequency oscillator for providing a radial reference line on a radar scope.

Figure 2 is a schematic wiring diagram of the system shown in Figure 1.

Figure 3 shows a diametral direction reference on a radar scope as provided by a triggering circuit used heretofore providing two pulsations during each modulated signal cycle and, Figure 4 shows a radial direction reference on a radar scope as provided by the triggering circuit of the present invention wherein the triggering circuit provides only a single pulse each modulated signal cycle.

Figure 1:
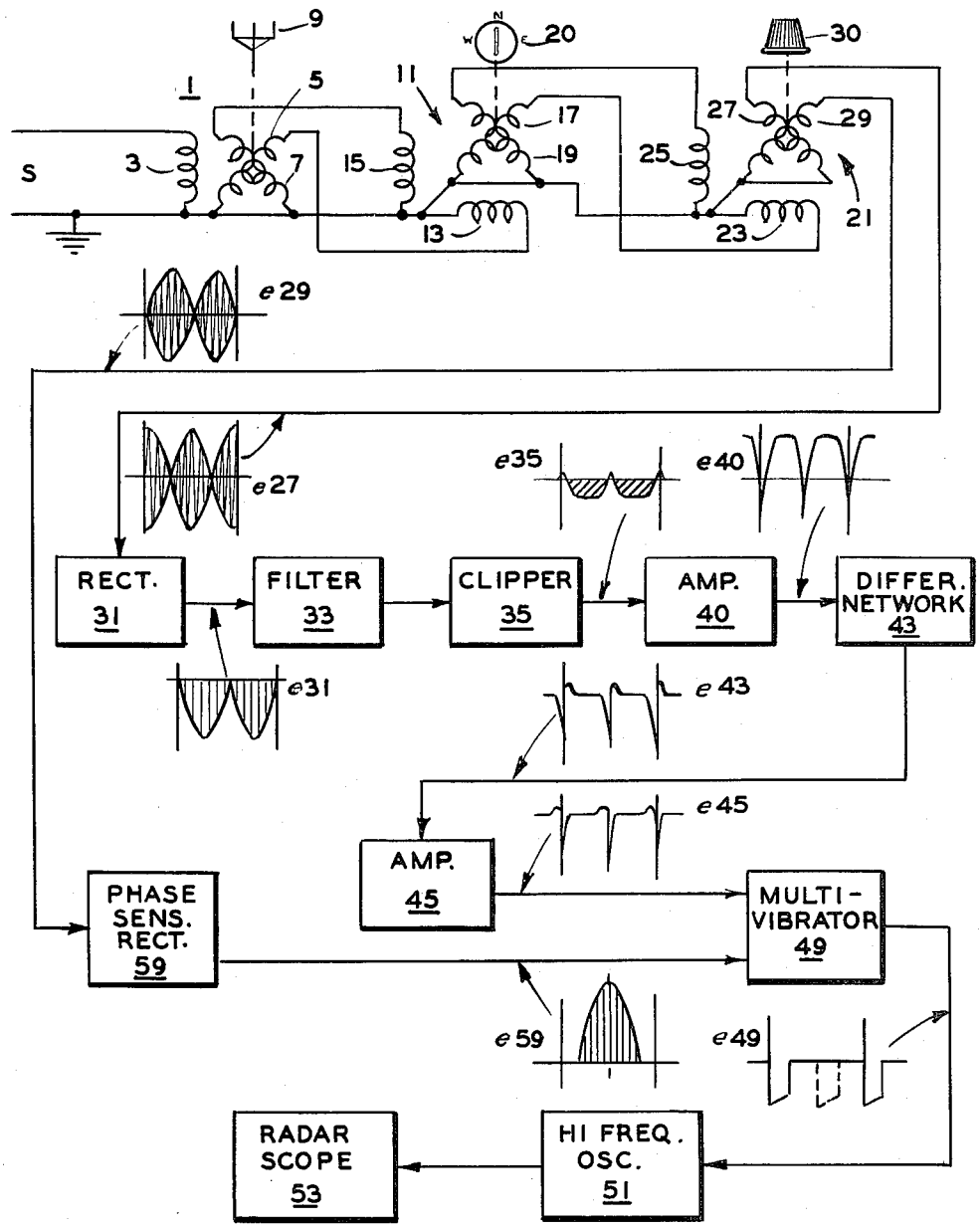

Referring now to the drawings for a more detailed description of the novel triggering circuit of the present invention, the triggering circuit is shown in Figures 1 and 2 of the drawings as comprising an inductive signal generator 1 having a stator winding 3 excited by an alternating current source S and a pair of rotor windings 5, 7 disposed 90 electrical degrees from one another drivably connected to a rotating antenna 9. Rotor windings 5, 7 are inductively coupled to stator winding 3 and provide modulated alternating current signals having identical waveforms, but having their modulation envelopes displaced from one another by 90 degrees.

The signals across rotor windings 5, 7 are applied to an inductive repeater 11 having a pair of stator windings 13, 15 disposed 90 electrical degrees from one another and connected to windings 5, 7, respectively. Repeater 11 also has a pair of rotor windings 17, 19 disposed 90 electrical degrees from one another and inductively coupled to stator windings 13, 15. Rotor windings 17, 19 are drivably connected to a compass 20 or other directional indicating system so that the rotor is rotated relative to the stator in response to changes in direction of the craft in which the system is mounted.

A second repeater 21 has a pair of stator windings 23, 25 connected to windings 17, 19, respectively, and a pair of rotor windings 27, 29 positioned 90 electrical degrees from one another and inductively coupled to stator windings 23, 25. Rotor windings 27, 29 are driveably connected to a manual control 30 for changing the direction reference. The modulated signals across windings 27, 29, like the signals across windings 5, 7, have identical waveforms, but the modulation envelopes are displaced 90 electrical degrees from one another as shown in Figure 1 at $e_{27}$ and $e_{29}$, respectively. The phases of the modulation envelopes of signals $e_{27}$ and $e_{29}$ relative to the phases of modulation envelopes across windings 5, 7 are determined by the angular disposition of the rotor windings of repeaters 11 and 21 relative to their stator windings. The signals $e_{27}$ and $e_{29}$ across rotor windings 27, 29 of repeater 21 control a one-shot multivibrator 49 in the manner described hereinafter to provide one trigger pulse for each revolution of antenna 9.

The voltage $e_{27}$ across rotor winding 27 is rectified by a diode 31 and the rectified voltage $e_{31}$ is applied to a resistance-capacitance filter 33. The filtered rectified voltage is fed to the clipper circuit 35 including a diode 37 and a limiting biasing source 39. The output $e_{35}$ of clipper circuit 35 is amplified by a conventional amplifier 40, including a pentode 41, and provides a voltage $e_{40}$ having a series of pulses corresponding in phase to the reversals of voltage $e_{35}$. The amplified voltage $e_{40}$ is fed to a resistance-capacitance differentiating network 43 to provide sharp pulse voltages $e_{43}$ which are amplified by a conventional amplifier 45 having a pentode 47. The amplified voltage $e_{45}$ comprises a series of sharp pulses and is applied to one-shot multivibrator 49 having a pair of triodes 50, 52. The output of the multivibrator is shown as controlling a high frequency oscillator 51 connected to a radar scope 53.

If the multivibrator was energized by voltage pulses $e_{45}$ alone, then the multivibrator would provide two trigger pulses for each revolution of antenna 9, as shown in solid and dotted lines at $e_{49}$, and the direction reference 55 on radar scope 53 would appear as a diametral line as shown in Figure 3 and the observer could not be sure whether the direction reference indicated north or south. To overcome this difficulty, the voltage $e_{29}$ across rotor winding 29 of repeater 21 is used to render ineffective alternate pulsations of voltage $e_{45}$ so that multivibrator 49 is energized only once for each revolution of the antenna, as shown in solid lines at $e_{49}$, and the direction reference on the radar scope appears as a radial line 57, as shown in Figure 4.

To this end, output voltage $e_{29}$ across rotor winding 29 of repeater 21 is applied to a cathode follower phase sensitive rectifier 59 including a triode 61 having its plate 63 energized by alternating power source S. The rectifier conducts during the greater portion of the half cycle when the plate voltage is positive and provides a pulsating output voltage $e_{59}$ in phase with alternate pulsations of voltage $e_{45}$. Voltage $e_{59}$ is applied to multivibrator 49 and renders ineffective alternate pulsations of voltage $e_{45}$. Multibrator 49 is energized only by intermediate pulsations of voltage $e_{45}$ so that the multivibrator provides an output $e_{49}$ having only one trigger pulse for every two pulses of the input voltage $e_{45}$ or, in other words, the output $e_{49}$ of the multivibrator provides a single trigger pulse for each revolution of antenna 9, as shown in solid lines.

While the triggering circuit is shown as providing a direction reference on a radar scope, it should be understood that the triggering circuit may be used for any suitable purpose such as, for example, an electronic switch.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A circuit of the class described comprising a signal generator for providing alternating current signals 90 degrees out of phase with one another, means connected to said signal generator for receiving one of the signals and producing a sharp pulse with each reversal of the signal, and means connected to said signal generator and controlled by said other signal for rendering ineffective alternate voltage pulses from said first means so that the output of said circuit comprises a series of sharp pulses corresponding to the frequency of the signal.

2. A circuit of the class described comprising a signal generator for providing alternating current signals 90 degrees out of phase with one another, means connected to said signal generator for receiving one of the signals and producing a sharp pulse with each reversal of the signal, means connected to said signal generator and controlled by said other signal for rendering ineffective alternate voltage pulses from said first means, and a multivibrator connected to said first means and to said second means and responsive to the remaining pulses from said first means so that said multivibrator produces a single trigger pulse for each signal cycle.

3. A circuit of the class described comprising a signal generator for providing alternating current signals 90 degrees out of phase with one another, means connected to said signal generator for receiving one of the signals and producing a series of sharp voltage pulses occurring at a time corresponding to the phase of the signal relative to the phase of a reference voltage, means connected to said signal generator and controlled by said other signal for rendering ineffective alternate voltage pulses from said first means, and a multivibrator connected to said first and said second means and responsive to the remaining pulses from said first means.

4. A circuit of the class described comprising a rotating signal generator for providing alternating current signals 90 degrees out of phase with one another, means connected to said signal generator for receiving one of said signals and producing a sharp voltage pulse with each reversal of the signal, a multivibrator connected to said means and energized by said voltage pulses, means connected to said signal generator and controlled by said other signal and connected to said multivibrator for rendering ineffective alternate voltage pulses from said first means so that said multivibrator responds to the remaining pulses and produces a single trigger pulse for each revolution of the signal generator.

5. A circuit of the class described comprising a signal generator for providing alternating current signals 90 degrees out of phase with one another, a rectifier connected to said signal generator for receiving one of said signals and producing a uni-directional pulsating voltage, a clipper circuit connected to said rectifier and limiting the amplitude of said pulsating voltage, an amplifier connected to said clipper circuit and producing a series of pulses corresponding to the reversals of said pulsating voltage, a phase sensitive rectifier connected to said signal generator for receiving the other signal and providing a uni-directional pulsating voltage having a frequency corresponding to the frequency of the signal, and a multivibrator operatively associated with said amplifier and with said phase sensitive rectifier, the uni-directional pulsating voltage from said phase sensitive rectifier rendering ineffective alternate pulses from said amplifier so that said multivibrator responds to the remaining pulses from said amplifier and produces a single trigger pulse for each signal cycle.

6. A circuit of the class described comprising a signal generator for providing alternating current signals 90 degrees out of phase with one another, a rectifier connected to said signal generator for receiving one of said signals and producing a uni-directional pulsating voltage, a clipper circuit connected to said rectifier and limiting the amplitude of said pulsating voltage, an amplifier connected to said clipper circuit and producing a series of pulses corresponding to the reversals of said pulsating voltage, a differentiating network connected to said amplifier for sharpening the pulses, an amplifier connected to said differentiating network for amplifying said sharpened pulses, a phase sensitive rectifier connected to said signal generator for receiving the other signal and providing a uni-directional pulsating voltage having a frequency corresponding to the frequency of the signal, and a multi-vibrator operatively connected to said second mentioned amplifier and to said phase sensitive rectifier, the uni-directional ing to the frequency of the signal, and a multivibrator pulsating voltage from said phase sensitive rectifier rendering ineffective alternate pulses from said second amplifier so that said multi-vibrator responds to the remaining pulses from said second amplifier and produces a single trigger pulse for each signal cycle.

7. In a system of the class described a signal generator for providing alternating current signals 90 degrees out of phase with one another, a rotating antenna drivably connected to said signal generator, means connected to said signal generator for receiving one of the signals and producing a series of sharp voltage pulses occurring at a time corresponding to the phase of the signal relative to the phase of a reference voltage, means connected to said signal generator and controlled by said other signal for rendering ineffective alternate voltage pulses from said first means, a multivibrator connected to said first and said second means and responsive to the remaining pulses from said first means and producing a single trigger pulse for each revolution of said antenna, and oscilloscope means responsive to the output of said multivibrator and producing a radial line corresponding in position to the phase of the one signal relative to the reference voltage.

8. In a system of the class described a signal generator for providing alternating current signals 90 degrees out of phase with one another, a rotating antenna drivably connected to said signal generator, an electrical repeater connected to said signal generator, direction responsive means operatively connected to said repeater for uniformly changing the phases of said signals, means connected to said repeater for receiving one of the signals and providing a series of sharp voltage pulses occurring at a time corresponding to the phase of the signal, means connected to said repeater for receiving said other signal for rendering ineffective alternate voltage pulses from said first means, a multivibrator connected to said first and said second means and responsive to the remaining pulses from said first means so that said multivibrator provides a single trigger pulse for each signal cycle, and oscilloscope means operatively associated with said multivibrator and responsive to said trigger pulses and providing a radial line corresponding to the compass direction.

9. In a system of the class described a signal generator for providing alternating current signals 90 degrees out of phase with one another, a rotating antenna drivably connected to said signal generator, a pair of electrical repeaters connected to said signal generator, direction responsive means operatively connected to one of said repeaters and manually operated means operatively connected to said other repeater for changing the phases of said signals, means connected to said repeater for receiving one of the signals and providing a series of sharp voltage pulses occurring at a time corresponding to the phase of the signal, means connected to said repeater for receiving said other signal for rendering ineffective alternate voltage pulses from said first means, a multivibrator connected to said first and said second means and responsive to the remaining pulses from said first means so that said multivibrator provides a single trigger pulse for each signal cycle, and oscilloscope means operatively associated with said multivibrator and responsive to said trigger pulses and providing a radial line corresponding to the compass direction.

References Cited in the file of this patent

UNITED STATES PATENTS

| | | |
|---|---|---|
| 2,388,262 | Ganiayre et al. | Nov. 6, 1945 |
| 2,489,824 | Shenk | Nov. 29, 1949 |
| 2,531,425 | Grieg | Nov. 28, 1950 |
| 2,571,051 | Mizen | Oct. 9, 1951 |